United States Patent [19]

Nossen

[11] 4,317,206
[45] Feb. 23, 1982

[54] ON LINE QUALITY MONITORING

[75] Inventor: Edward J. Nossen, Cherry Hill, N.J.

[73] Assignee: RCA Corporation, New York, N.Y.

[21] Appl. No.: 148,994

[22] Filed: May 12, 1980

[51] Int. Cl.³ .................. H03K 13/32; H04Q 1/20
[52] U.S. Cl. .................... 375/10; 364/485; 455/67
[58] Field of Search .................. 370/13, 17; 179/175.2 R, 175.2 C; 375/10, 99; 371/15, 22; 455/67, 226; 324/77 A, 83 Q, 85; 364/481, 485

[56] References Cited

U.S. PATENT DOCUMENTS

| | | | |
|---|---|---|---|
| 3,351,853 | 11/1967 | Wood | 324/57 |
| 3,463,934 | 8/1969 | Nobis | 307/149 |
| 3,634,760 | 1/1972 | Murtin | 364/485 |
| 3,721,959 | 3/1973 | George | 328/162 |
| 3,895,349 | 7/1975 | Robson | 371/15 |
| 3,920,978 | 11/1975 | Schmitt | 364/485 |
| 3,971,989 | 7/1976 | Singer et al. | 455/67 |
| 4,028,622 | 6/1977 | Evans et al. | 455/67 |
| 4,034,285 | 7/1977 | Ashley et al. | 324/57 R |
| 4,034,340 | 7/1977 | Sant'Agostino | 371/22 |
| 4,035,833 | 7/1977 | Shepard | 358/10 |
| 4,074,201 | 2/1978 | Lennon | 324/57 N |
| 4,085,367 | 4/1978 | Williams et al. | 455/67 |
| 4,091,239 | 5/1978 | Lainey et al. | 370/17 |
| 4,091,240 | 5/1978 | Lainey et al. | 370/17 |
| 4,100,531 | 7/1978 | Fletcher | 375/10 |
| 4,125,809 | 11/1978 | Mott | 455/67 |
| 4,140,973 | 2/1979 | Stevens | 455/67 |
| 4,143,323 | 3/1979 | Cieslak et al. | 455/67 |

Primary Examiner—Benedict V. Safourek
Attorney, Agent, or Firm—Samuel Cohen; Robert L. Troike; Donald W. Phillion

[57] ABSTRACT

A system for on-line detection of distortion in a received digital signal which is phase modulated at a data rate $f_d$ and which has a suppressed carrier frequency $f_c$ and without interrupting the signal. The system comprises means for multiplying a received digital signal by itself N times to produce a resultant signal comprising a reconstructed carrier signal of frequency $Nf_c$ and phase $\phi_1$ and distortion produced upper and lower sidebands of frequencies $f_u = Nf_c + f_d$ and $f_l = Nf_c - f_d$ and also means for generating I and Q signals of frequency $Nf_c$ and of phase $\phi_1$ and $\phi_1 \pm 90°$, respectively. Further provided are means for generating a clock signal of frequency $f_d$ and a control means for mixing said I and Q signals with said clock signal to produce I/D and Q/D signals, respectively, where I/D represents the product of the I signal and said clock signal $f_d$ and Q/D represents the product of the Q signal and said clock signal D of frequency $f_d$. The control means is further constructed to independently mix said I signal, said I/D signal, and said Q/D signal with said first signal to produce d.c. voltages which define the distortion in the received digital signal.

9 Claims, 7 Drawing Figures

ON LINE QUALITY MONITORING

This invention relates generally to a structure and a method for determining the degree and nature of degradation in transmitted digital signals, and more particularly, for determining such degree and nature of degradation in a phase modulated digital signal at a receiver without interrupting the reception of said signal.

Modern communication systems frequently use phase modulated digital signals, such as bi-phase, quadraphase, minimum shift keyed (MSK) modulations, or other type phase modulation techniques employed in the transmission of intelligence. Basically, most of these phase modulated digital signals have the carrier suppressed by the modulation before transmission. At the receiver the received signal is first heterodyned to an intermediate frequency and subsequently processed to baseband where the phase modulated intelligence is extracted by well-known decoding means.

One problem attending the use of digitized signals for communication is that it is virtually impossible for a human operator at the receiver to determine the degree of noise or distortion present in the signal. With analog type transmission a human operator can hear noise and distortion and make many necessary corrections with equalizers, for example.

Digitized signals, however, cannot be heard in an analytical manner by the human ear and other means must be employed to determine if the quality of the signal has become or is becoming excessively degraded. It should be noted that it is a characteristic of phase modulated digitized signals that the error rate to noise level ratio is very steep so that an increase in noise of only a few decibels will result in a change of from practically no errors to an unacceptable level of errors.

The monitoring of digitized signals for errors has been accomplished in the prior art primarily by two techniques. One of these techniques is to periodically transmit a test signal of known characteristics and then to analytically observe such test signal to determine the type degradation occurring. A human operator then takes some appropriate action to correct for the degradation. The second method is to supply the received signal to a spectrum analyzer which will show the frequency components that should be present in a non-distorted signal and will also show the frequency components that should not be present in a non-distorted received signal. Such a technique, however, also requires a manual operation in that a human operator is needed to observe the results of the spectrum analyzer operation and to form conclusions therefrom and to make compensatory corrections.

The present invention provides a system and a method for constantly determining the degree and the nature of degradation in a received digital signal, which is phase modulated by data having a repetition rate $f_d$, without interrupting the signal and without knowing the intelligible contents thereof, and then taking appropriate action to correct for such degradation.

In accordance with a preferred embodiment, the invention comprises a means for multiplying the received signal by itself a sufficient number of times to eliminate the phase modulation, as for example, by doubling the frequency of the received signal for bi-phase modulation and quadrupling the received signal for quadraphase modulation. Such doubling or quadrupling of the received signal results in the reconstruction of the carrier signal plus those sideband distortion components introduced during the imperfect transmission of the signal. Further means are provided for generating in-phase (I) and quadrature-phase (Q) signals with respect to the reconstructed carrier, and means, including a clock signal source having a repetition rate $f_d$ for modulating said I and Q signals with said clock signal. Further means are provided for successively and iteratively mixing the reconstructed carrier and associated sideband distortion components with said I signal, said data clock pulse modulated Q signal, and said data clock signal modulated I signal to produce d.c. signals representative of the energy contents of the reconstructed carrier signal and the upper and lower sideband distortion components.

In the drawings:

FIG. 4A is a bar chart showing the sequence of signal processing of the invention;

Figure 4:
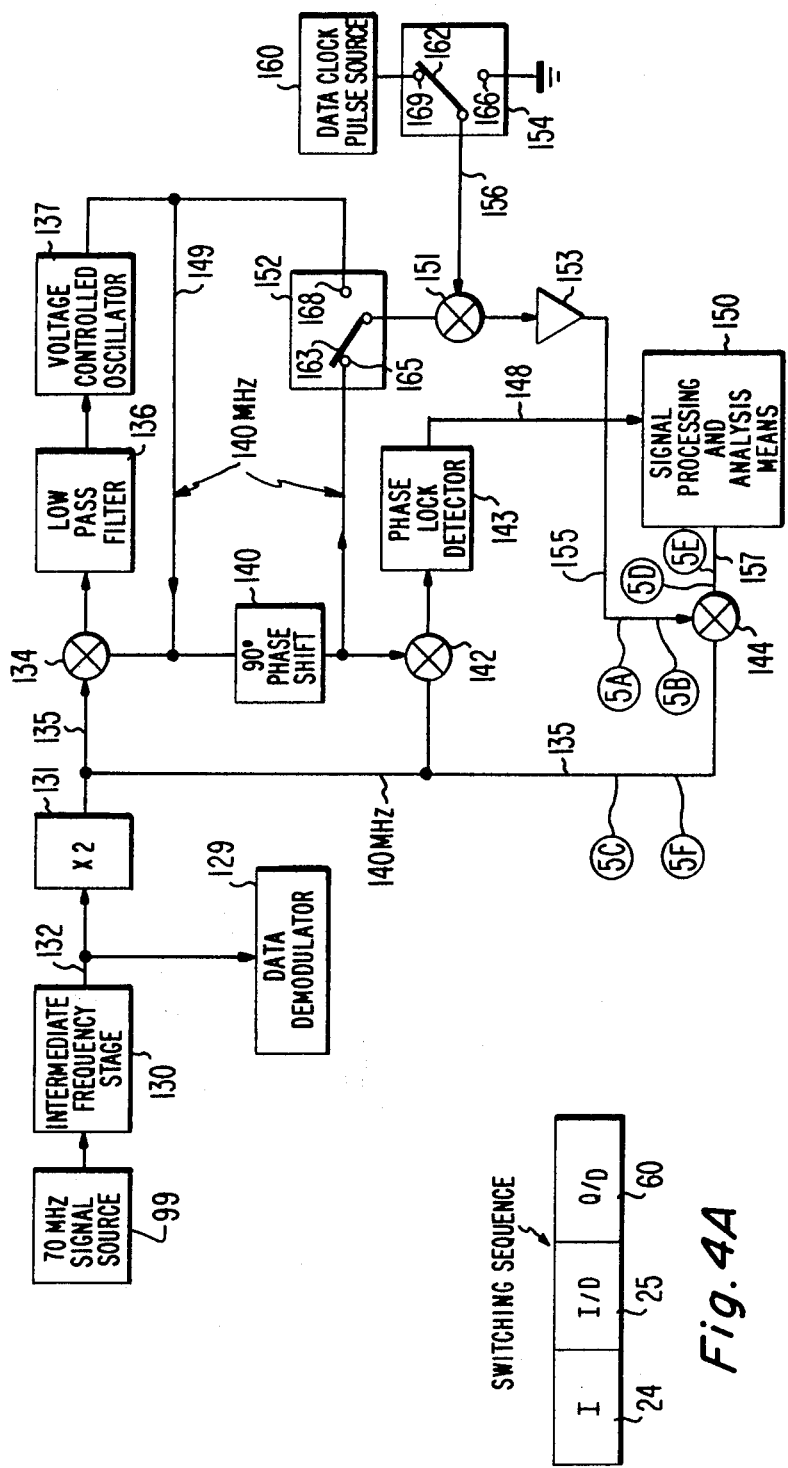
FIG. 4 is a block diagram of the invention.

Before discussing the specific logic of the present invention, as shown in FIG. 4, the nature of the received signal will be discussed and also the processing steps employed to analyze such received signal to determine at an early stage the degree and nature of the degradation occurring therein. As mentioned above, the invention is directed primarily at digitized signals which carry phase modulation thereon, such as bi-phase, quadraphase, MSK and other related types of phase modulation.

If the modulation at the transmitter is mathematically perfect and if there is no distortion introduced either in the transmission medium or at the receiver, then the doubling or quadrupling of the signal will, in the case of bi-phase or quadraphase modulation, respectively, eliminate all of the data components, leaving only the carrier signal at a multiple of nominal frequency $f_c$. It is to be understood that when the carrier signal is phase modulated at the transmitter, the carrier is suppressed and only the sidebands are transmitted. By doubling or quadrupling the received signal the sidebands are eliminated and the carrier reconstructed (assuming no distortion to be present). The reconstructed carrier signal is twice or four times the original carrier frequency because of the doubling or quadrupling thereof.

The elimination of the bi-phase or quadraphase modulation and the reconstruction of the carrier signal by doubling or quadrupling the received signal is well known in the art and will not be discussed in detail herein. However, for one or more of several reasons the received phase modulated signal might have acquired a degree of distortion which, if large enough, will cause an unacceptable level of bit error. Such distortion can be introduced, for example, by asymmetrical filter response, either at the transmitter or at the receiver, or by asymmetrical distortion introduced by the propagation medium or by antenna resonance. In general, asymmetrical distortion (non-linear distortion) means that one of the sidebands is distorted more than the other of the two sidebands. A lower data rate might still be affected by asymmetrical distortion. Symmetrical distortion implies uniform distortion across the bandwidth which limits bandwidth with respect to data rate. Lowering the data rate can substantially eliminate symmetrical distortion.

Figure 1:
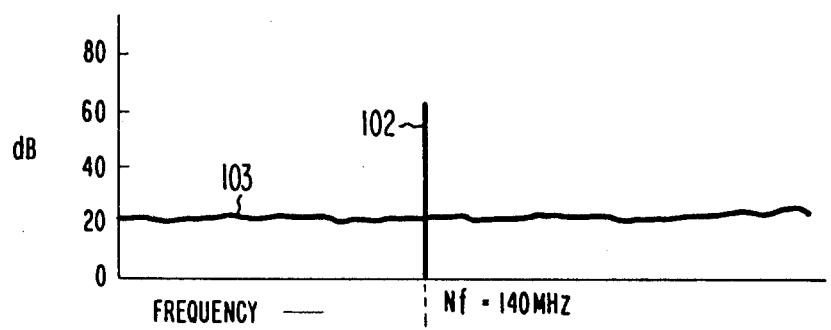
FIG. 1 shows a power spectrum of a received signal in which the carrier has been reconstructed in a substantially unfiltered manner.

Referring now to FIG. 1 there is shown a received signal having a nominal carrier frequency of 140 MHz with bi-phase phase modulation thereof after multiplication by 2, i.e., after doubling the received signal. The vertical bar 102 shows a power spectrum of the reconstructed 140 MHz center frequency. In the chart of FIG. 1 the doubling of the received signal was effected with virtually no filtering so that the sidebands present in the received signal due to phase modulation of the carrier signal by the encoded data are almost completely eliminated. Worded in another way, since the multiplication of the received signal by itself is done with virtually no filtering the abrupt phase transitions of the carrier signal due to phase modulation thereof by the encoded data are substantially reproduced, thereby preventing the generation of such sidebands.

In FIG. 1 the white noise level is represented by reference character 103 and which, in a typical operating environment, might be approximately 50 decibels below the level of the reconstructed carrier signal 102.

Figure 2:
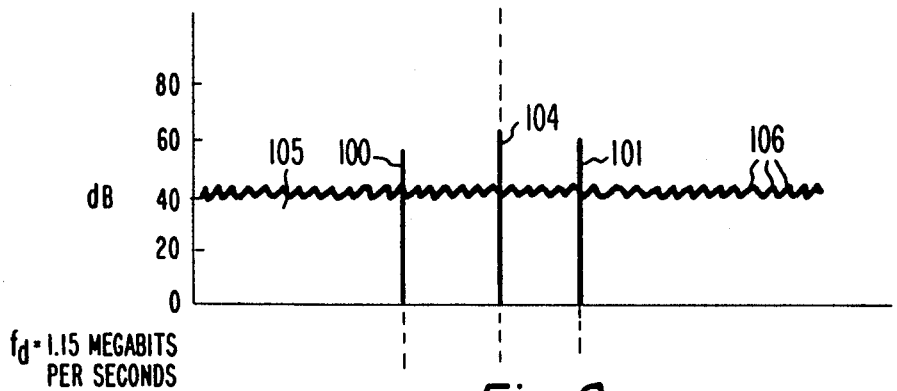
FIG. 2 shows a power spectrum of a received signal in which the carrier has been reconstructed by demodulating means including filtering and further showing the distortion introduced by the spurious sidebands resulting from the filtering.

In FIG. 2 there is shown the results of doubling the received signal through a 4.6 MHz bandpass filter, with an assumed data rate of 1.15 megabits per second. Due to the effect of the filtering the phase transitions of the received signal are not sharply defined in that it now takes a longer time interval for the phase transitions to occur, thereby preventing a complete cancellation of the sidebands caused by the data modulation. The two vertical lines 100 and 101 in FIG. 2 extending up from the white noise level 105 represent such sidebands which remain after doubling the frequency of the received signal. The vertical line 104 represents the reconstructed 140 MHz carrier signal.

Figure 3:
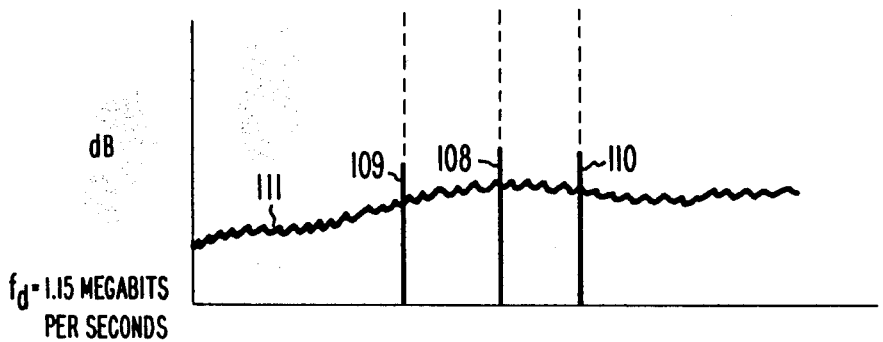
FIG. 3 shows a power spectrum of a received signal with the carrier reconstructed and more narrowly filtered and with the distortion introduced by the spurious sidebands resulting from the filtering.

The upper and lower sidebands 100 and 101, frequency spaced from the carrier frequency 104 by the data repetition rate $f_d$, can be seen to be of substantially equal amplitude which is indicative of symmetrical type distortion. While symmetrical type distortion is also undesirable in detecting the intelligence modulated on the received signal it does not present as serious a problem as does asymmetrical distortion wherein the two sideband signals 109 and 110 are of unequal amplitude, as shown in FIG. 3. The fine structure vertical lines 106 in FIG. 2 represent inter-frequency modulation components caused primarily by the filtering action.

In FIG. 3 the received signal has been filtered by a 1.15 MHz bandpass filter with the data rate again being 1.15 megabits per second. The reconstructed carrier signal 108 and the two sidebands 109 and 110 caused by the modulating data signals extend out of the white noise level 111 which, as can be seen, is greater than the white noise level 105 shown in FIG. 2. The differences in shape and magnitude of the white noise levels 105 and 111 of FIGS. 2 and 3 are caused by the difference in filter bandwidth.

It is to be noted in FIG. 3 that the amplitudes of the two sideband signals 109 and 110 are different and that both signals are closer to the amplitude of the reconstructed carrier signal 108 than is the case of the two sideband signals 100 and 101 of FIG. 2 with respect to the reconstructed carrier signal 104. The foregoing is due to the narrower filter bandpass employed to produce the power spectrum of FIG. 3. The use of the narrower filter before doubling the signal not only increases the amplitude of the sidebands 109 and 110 with respect to the reconstructed carrier 108 but also accentuates any other asymmetrical distortion introduced into the signal at the transmitter or during transmission thereof. More specifically, the difference in amplitude of the two sidebands 109 and 110 represents asymmetrical degradation which, as discussed above, is due to factors which affect one sideband more than the other.

With the narrower filter employed to produce the power spectrum of FIG. 3 a number of characteristics can be determined. For example, the relation of the reconstructed carrier 108 can be more accurately related to the background noise 111 and also to the upper and lower sideband components 109 and 110 which represent the distortion. The fact that these sidebands have unequal amplitudes enables an analysis of the nature of the degradation by computations based on the sum and difference of the two sidebands 109 and 110 along with the relation of such sum and difference to the amplitude of the center frequency represented by vertical line 108. As will be discussed later herein I and Q signals are developed having the frequency of the reconstructed carrier, with the I signal being in phase therewith and the Q signal being 90° out of phase therewith.

The I signal is mixed with the reconstructed carrier signal 108 to produce a d.c. output signal proportional to the amplitude of the reconstructed carrier signal 108. Both the I and Q signals are then modulated by a clock signal having a frequency equal to the data repetition rate to produce two resultant signals in which the carriers (the I and Q signals) are suppressed and having upper and lower sidebands whose frequencies are determined by the repetition rate of the modulating data clock pulses. These two clock signal modulated I and Q signals are then separately mixed with the received and reconstructed carrier signal (doubled in frequency) to produce d.c. outputs which, when their absolute magnitudes are added together, represent the total energy content of the distortion representing upper and lower sidebands caused by the incomplete elimination of the data produced sidebands present in the received signal and which, when their absolute magnitudes are subtracted one from the other, represent the difference in the total energy content of such upper and lower distortion representing sidebands.

Figure 5:
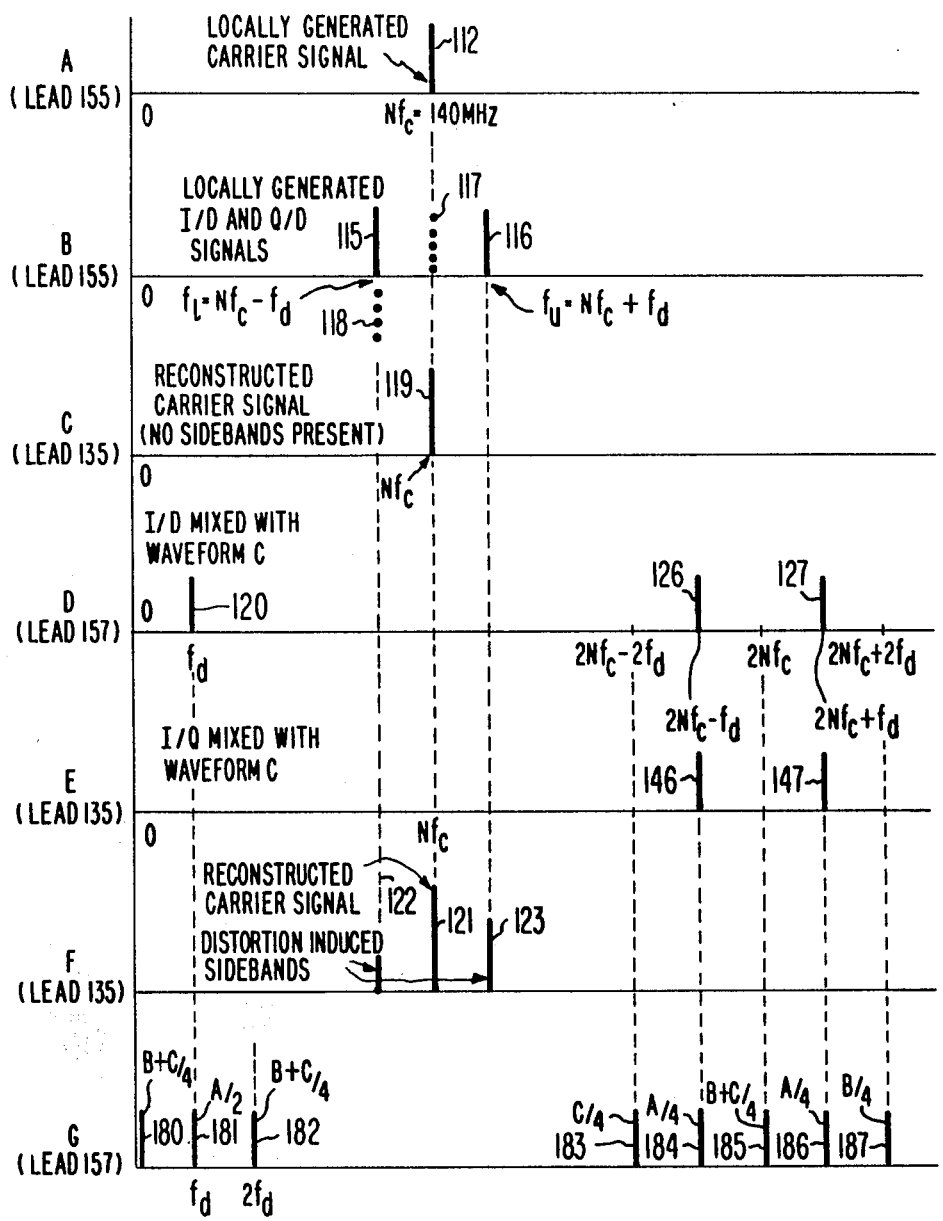
FIGS. 5A through 5G show a series of power spectra resulting from mixing locally generated spectra with the received signal after the reconstruction of the carrier thereof.

The foregoing is represented graphically by the seven power spectra charts of FIG. 5. The seven charts of FIG. 5 will be identified as power spectra 5A, 5B,-5G. The points in the logic diagram of FIG. 4 on which a given signal of FIG. 5 appears are identified by the figure number of such signal. For example, the signal corresponding to power spectrum 5A appears on lead 155 of FIG. 4 as indicated by the encircled notation 5A on lead 155 of FIG. 4.

Since the same point in FIG. 4 will, at different times, have different signals appearing thereon more than one FIG. 5 waveform notation will appear on some leads in FIG. 4. For example, signal 5B will appear on lead 155 of FIG. 4 at a time different from signal 5A as will be discussed in detail later herein. Thus, both encircled notations 5A and 5B appear on lead 155.

Before discussing the relationship between the various power spectra of FIG. 5, the logic diagram of FIG. 4 will be discussed in order to facilitate an understanding of how the power spectra of FIG. 5 are generated and how they are combined to produce the desired results.

In FIG. 4 a received signal with a suppressed 70 MHz carrier signal is supplied from source 99 to an intermediate frequency (IF) stage 130, the output of which is supplied to a conventional data demodulator 129 via lead 132. Such IF signal is also doubled in doubler 131 and then supplied to a phase-lock loop consisting of mixer 134, low pass filter 136, and voltage controlled oscillator (VCO) 137 having a nominal output frequency of 140 MHz. The output of VCO 137 is supplied back to mixer 134 via lead 149 to establish phase lock with the reconstructed 140 MHz carrier signal appearing at the output of frequency doubler 131 in a well known manner. Such phase lock occurs when the signal supplied from doubler 131 and the output from VCO 137 are 90° out of phase with each other. Thus the signal on lead 149 is is phase quadrature with the signal on lead 135 and is herein designated as the Q signal.

To obtain the I signal which is in phase with the signal appearing on lead 135, the Q signal is passed through 90° phase shift means 140. The I signal is then supplied to mixer 142. When phase lock occurs the phase lock detector 143 will respond thereto to enable, via lead 148, signal processing and analysis means 150 whose function will be described later herein.

Both the I and Q signals are supplied to different contacts of a single-pole double-throw switch 152 which will supply the I and Q signals to a balanced modulator 151 in a predetermined time sequence to be discussed in detail later and which is shown generally in FIG. 4A. A clock signal having a frequency $f_d$ equal to the data rate encoded on the received signal is supplied from source 160 to a second input 156 to balanced modulator 151 through armature 162 of a second single-pole double-throw switch 154. The other contact of switch 154 is connected to ground potential. The armature 162 thereof switches between the two contacts 166 and 169 thereof to alternatively supply the clock signal (which modulates the I and Q signals to form signals identified herein as I/D and Q/D signals, where I/D represents the product of the I signal and said clock signal $f_d$ and Q/D represents the product of the Q signal and said clock signal of frequency $f_d$ and D is the said clock signal) and a grounding potential to the second input 156 of balanced modulator 151 for reasons and in a timing sequence that will be discussed in more detail below.

The 140 MHz I signal is shown in power spectrum 5A as vertical line 112, and the I/D and Q/D signals are both represented by the power spectrum of FIG. 5B, although it is to be understood that the sidebands 115 and 116 of power spectrum 5B, when power spectrum 5B represents Q/D, has a phase 90° removed from the phase of power spectrum 5B when it represents I/D because of the 90° phase separation of the I and Q signals.

The three signals, including the I signal, the Q signal phase modulated by the clock signal from source 160 (the Q/D signal), and the I signal phase modulated by the clock signal from source 160 (the I/D signal) are supplied from balanced modulator 151 through amplifier 153 to one input of mixer 144, the other input of which receives the doubled received signal including the reconstructed 140 MHz signal shown under different distortion conditions in power spectrums 5C and 5F. More specifically, the power spectrums 5C and 5F show, respectively, conditions of no distortion present and some distortion present, as will be discussed later.

One possible sequence of supplying the I signal, the I/D signal, and the Q/D signal to mixer 144 from balanced modulator 151 is shown in FIG. 4A. More specifically, the I signal is first supplied to mixer 144 through balanced modulator 151 when the armatures 163 and 162 of switches 152 and 154 are connected respectively to contacts 165 and 166 under control of timing means to be discussed later herein in connection with the logic of FIG. 6.

Figure 6:
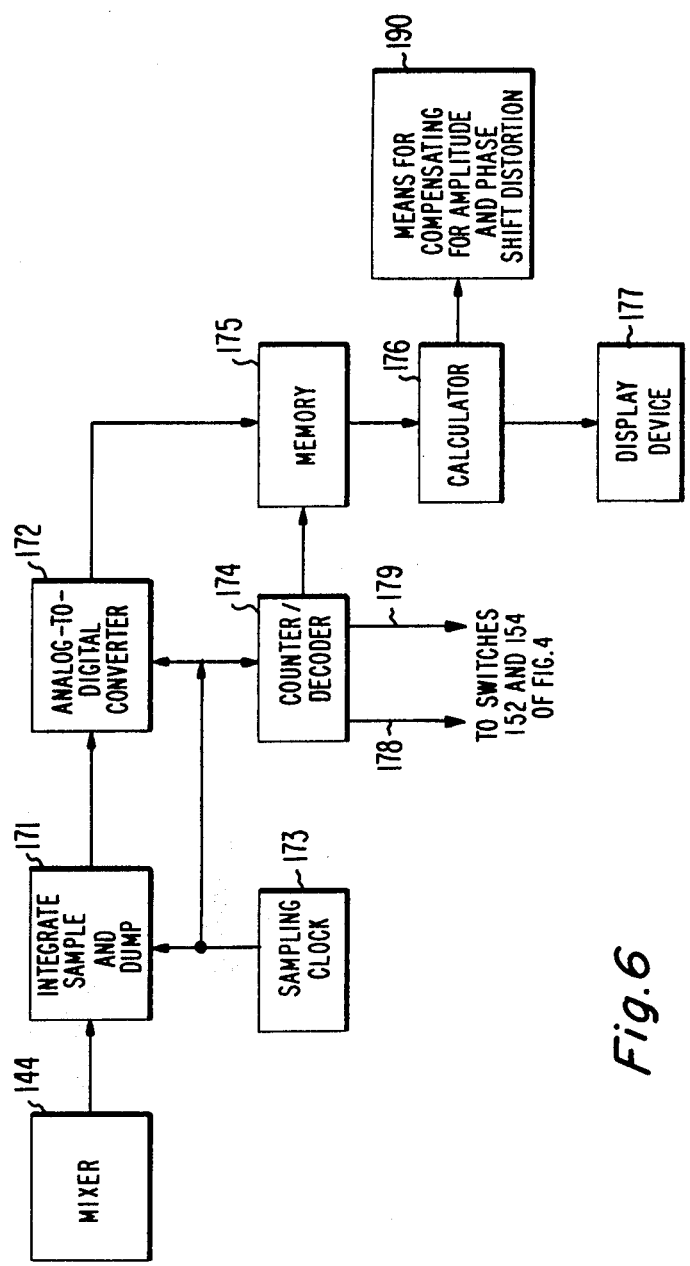
FIG. 6 is a more detailed block diagram of a portion of FIG. 4.

Next, as shown in block 25 of FIG. 4A, the I/D signal is supplied from mixer 151 to mixer 144 when the armatures 163 and 162 of switches 152 and 154 are connected respectively to contacts 165 and 169 of switches 152 and 154, also under control of the logic of FIG. 6.

Finally, the Q/D signal is supplied from balanced modulator 151 to mixer 144 when the armatures 163 and 162 of switches 152 and 154 are connected respectively to contacts 168 and 169, again under control of the logic of FIG. 6.

Assume first that the received signal, i.e. the frequency doubled signal appearing on lead 135 has no distortion therein and is as represented by waveform 5C. Because no distortion is present in the received signal, no sidebands are present. The single vertical bar 119 of power spectrum 5C represents the reconstructed 140 MHz carrier signal. Such signal 119 of spectrum 5C on lead 135 is mixed with the I signal (the in-phase signal) of spectrum 5A to produce double frequency output signal components, and a d.c. output signal from mixer 144 which are supplied to signal processing and analysis means 150. Such d.c. output is not shown in FIG. 5 but does represent the energy level of the received reconstructed carrier signal. Next, the I/D signal represented by power spectrum 5B is mixed with the reconstructed carrier 119 ($e_{119}$) of spectrum 5C to produce the output shown in spectrum 5D. The signal represented by the vertical line 120 in spectrum 5D has a frequency equal to the data rate. The signal 126 is at twice the carrier minus the data rate while the signal represented by vertical line 127 is at twice the carrier plus the data rate frequency. There is no d.c. supplied from mixer 144.

Similarly, when the Q/D signal, also represented by power spectrum 5B, but having a 90° relationship with the I/D signal previously discussed, is mixed with the undistorted doubled frequency received signal represented by power spectrum 5C the result includes signals represented by vertical lines 146 and 147, as shown in power spectrum 5E and having a frequency equal to twice the carrier minus and plus respectively the data rate but with the phase 90° removed from the previously discussed mixing of the I/D signal spectrum 5B and the undistorted doubled frequency received signal of power spectrum 5C.

In the usual case, however, distortion is in fact present in the received signal so that when the frequency of such received signal is doubled it will produce the power spectrum of FIG. 5F, wherein vertical line 121 represents the reconstructed 140 MHz carrier signal and vertical lines 122 and 123 represent the upper and lower sideband signals which are removed from the frequency of the carrier signal 121 by a frequency equal to the data rate. The upper and lower sideband signals 122 and 123 represent the degree of distortion in the signal as discussed hereinbefore in connection with FIGS. 2 and 3.

The mixing of the I signal of power spectrum 5A with the frequency doubled received signal of power spectrum 5F produces a d.c. output. In this stage of the operation output signals resulting from the presence of the two distortion signals 122 and 123 of power spectrum 5F occur at frequency $f_d$ which is not passed by the low pass filter 171 (integrate, sample and dump) of FIG. 6.

However, when the I/D signal of power spectrum 5B is mixed with the frequency doubled received signal of power spectrum 5F, the output of mixer 144, shown in power spectrum 5G, consists of a d.c. component 180 and numerous other components including components at $f_d$, $2f_d$, $2Nf_c + f_d$, $2Nf_c - f_d$, $2Nf_c + 2f_d$, $2Nf_c - 2f_d$, and $2Nf_c$. It is to be noted that frequency spectrum 5G contains the results of mixing both I/D and Q/D with the received signal of waveform 5F. The amplitude of each frequency component 181-187 is indicated by the values A, B, and C from Expression 4. The d.c. component 180 is a result of the lower sideband 115 of spectrum 5B mixing with the lower distortion produced sideband 122 of spectrum 5F, both of which are at the same frequency, and also the mixing of the upper sideband 116 of spectrum 5B with the upper distortion produced sideband component 123 of spectrum 5F, both of which are also at the same frequency.

The magnitude of the d.c. components 180 is determined by the phase relationship of the two sidebands 115 and 116 of power spectrum 5B and the two sidebands 122 and 123 of power spectrum 5F. For example, if such phase relationship is 90° the d.c. component 180 of waveform 5G will be of zero amplitude. On the other hand, if the phase relationship is 0° or 180°, the d.c. component 180 of power spectrum 5G will be either a positive or negative maximum. Most likely, however, such phase relationship will be somewhere in between a 90° relationship and a 0° or 180° phase relationship. For this reason both the I/D and the Q/D signals, both represented by power spectrum 5B, as discussed above, are mixed with the frequency doubled received signal of power spectrum 5F to produce the results shown in power spectrum 5G. However, the amplitude of the d.c. component 180 resulting from mixing the Q/D signal with the received doubled frequency will be different than was obtained when I/D was mixed with the frequency doubled received signal. Additional components occur at $2f_d$, $2Nf_c - 2f_d$, $2Nf_c - f_d$, $2Nf_c$, $2Nf_C + f_d$, and $2Nf_c + 2f_d$.

Thus, there has been produced at the output of mixer 144 of FIG. 4 a d.c. voltage representing the energy of the reconstructed carrier followed by two d.c. voltages representing the energy content of the distortion present in the received signal. If there is no phase shift in the carrier frequency components of the two sidebands the mixing of the Q/D signal with the doubled frequency input signal will result in no d.c. components because of the 90° relationship between the Q/D signal and the reconstructed carrier signal sidebands. Thus any d.c. components resulting from the mixing of the I/D signal with waveform 5F indicates amplitude distortion in the received signal. The degree of amplitude distortion is represented by the amplitude of the last-mentioned d.c. component and in fact represents the total amplitude distortion in both the upper and lower sidebands. The relative contributions to such d.c. component by the upper and lower sidebands can be determined by comparing the relative amplitudes of the coefficients B and C of Expression 4 which are respectively proportional to such relative d.c. component contributions of the upper and lower sidebands.

The determination of the relative contributions to the d.c. component are employed in determining the steps to be taken to reduce the amplitude distortion in the received signal.

If phase distortion is present in the received signal as evidenced by a d.c. component resulting from mixing the Q/D signal with the received doubled frequency input signal, then a portion of the d.c. component produced by mixing the I/D signal with the received signal is also due to phase distortion. The amount of d.c. voltage resulting from phase distortion between the I/D signal and the received doubled frequency input signal can then be determined since it is a result of the cosine function of the phase error whereas the d.c. voltage produced by comparing the Q/D signal with the received signal is a function of the sine of the phase error.

While most amplitude and phase distortion can be determined by analysis of the d.c. components, a more refined analysis can be made by also considering the various frequency components.

The mathematical expressions for producing the various signals employed in the structure of FIG. 4 are as follows:

$$I = \cos \omega_c t \quad (1)$$
$$Q = \sin \omega_c t \quad (2)$$
$$\text{where } \omega_c = f(Nf_c)$$
$$D = \cos \omega_d t \quad (3)$$
$$\text{where } \omega_d = f(f_d)$$

The received frequency doubled signal $e_{135}$ at point 135 in FIG. 6 and represented by lines 121, 122, and 123 in frequency spectra 5F is:

$$e_{135} = A \cos \omega_c t + B \cos(\omega_c + \omega_d)t + C \cos(\omega_c - \omega_d)t \quad (4)$$

$$\text{signal } I/D = I \times D = \cos \omega_c t(\cos \omega_d t) \quad (5)$$

$$\text{signal } Q/D = Q \times D = \sin \omega_c t(\cos \omega_d t) \quad (6)$$

$$I/D(e_{135}) = \frac{A}{2}[\cos \omega_d t + \tfrac{1}{2}\{\cos(2\omega_c + \omega_d)t + \cos(2\omega_c - \omega_d)t\}] + \frac{B}{4}[\cos(2\omega_c + 2\omega_d)t + \cos 2\omega_c t + 1 + \cos 2\omega_d t] + \frac{C}{4}[\cos(2\omega_c t) + \cos(2\omega_c - 2\omega_d)t + 1 + \cos 2\omega_d t] \quad (7)$$

$$Q/D(e_{135}) = \frac{A}{4}[\sin(2\omega_c + \omega_d)t + \sin(2\omega_c - \omega_d)t] + \frac{B}{4}[\sin 2\omega_c t + \sin(2\omega_c + 2\omega_d)t + \sin 2\omega_d t] + \frac{C}{4}[\sin 2\omega_c t + \sin(2\omega_c - 2\omega_d)t + \sin 2\omega_d t] \quad (8)$$

The d.c. components and the various frequency components of Expressions 7 and 8 are shown in frequency spectrum 5G and can be determined by an examination of the expression. Specifically, the following frequency terms represent a component represented generally by one of the vertical lines or bars 181-187 of frequency spectrum 5G. A d.c. component is represented as a constant in Expressions 7 and 8 and generally by bar 180 of frequency spectrum 5G.

| Frequency component | Bar |
|---|---|
| $\omega_d$ | 181 |

-continued

| Frequency component | Bar |
| --- | --- |
| $2\omega_d$ | 182 |
| $2\omega_c - 2\omega_d$ | 183 |
| $2\omega_c - \omega_d$ | 184 |
| $2\omega_c$ | 185 |
| $2\omega_c + \omega_d$ | 186 |
| $2\omega_c + 2\omega_d$ | 187 |

The values A, B, and C are the coefficients A, B, and C of the frequency doubled received signal.

There is no d.c. component shown in Expression 8 since a 90° phase relation is assumed between Q/D and the received frequency doubled input signal. If other than a 90° phase relation exists a d.c. component will also exist indicating the degree of phase distortion from a 90° phase relationship.

Reference is now made to FIG. 6 to better understand the means by which the aforementioned d.c. values can be processed to facilitate a determination of the degree and nature of degradation of the received signal and also to relate together the timing of the two switches 152 and 154 of FIG. 4. In FIG. 6, the output of mixer 144, which corresponds to mixer 144 of FIG. 4, is supplied to an integrate, sample, and dump (ISD) circuit 171 which functions under control of sampling clock source 173. The sampling rate of clock source 173 need have no relationship to the data rate of the received signal or the clock signal source 160 of FIG. 4.

The output of the ISD logic 171, an analog signal, is supplied to analog-to-digital converter (ADC) 172 which outputs a digitized form of the analog signals received from ISD logic 171 at a rate determined by sampling clock 173. Such digitized words are then supplied to memory 175 which stores them in predetermined memory locations under control of counter/decoder 174 which is activated by the output of sampling clock source 173.

It is to be understood that the digitized words from the ADC 172 represent the d.c. values produced by the mixing in mixer 144 of FIG. 4, of the I, the I/D and the Q/D signals with the received frequency doubled signal, as discussed hereinbefore. Thus, the digitized words supplied to memory 175 represent a series of groups of three d.c. values which are stored successively in successive word locations of memory 175 under control of counter/decoder 174.

After a group of three digitized words is stored in memory 175 they can then be supplied to calculator means 176 which can perform the various calculations required to determine the degree and the nature of the distortion and then to provide means to mitigate the distortion. The degree and nature of the distortion and the corrective means employed to correct such distortion can be displayed on a display device 177 in the form of waveforms or in the form of numerals representing types of distortion, the degree thereof, and the corrective measures taken.

It is to be noted that the analysis of the degree and specific nature of the distortion, calculated from the derived signal components of spectrum 5G, is not per se part of this invention and will not be set forth in detail herein. Such analytical techniques are known in the art and can be performed with the parameters provided, e.g. the groups of three d.c. values represented by binary words supplied to memory 175 from the ADC 172. Generally, appropriate filtering action will be provided to compensate for amplitude distortion and phase shift means to compensate for phase error, both of which can be done either at the transmitter or the receiver by logic 190. The data rate can also be reduced.

It is also to be understood that memory 175 can have many memory locations to store any desired number of groups of three digitized words so that the calculator 176 can detect trends or changes in the degree and nature of the distortion on a current time basis beginning at an early time in the development of a distortive trend. For example, the memory 175 could have 300 memory locations which would accumulate 100 groups of three digitized words. The counter 174 could have a count capacity of 300 and constantly recycle successive blocks of 100 groups of three digitized words into memory 175 so that each newly received group of three digitized words could be examined in the light of the previously received 99 groups of three digitized words. Other memory arrangements and methods of accessing the memory for desired groups of the three digitized words will be apparent to those skilled in the art.

The signals supplied to the two output leads 178 and 179 of counter/decoder 174 respectively control switches 152 and 154 of FIG. 4. The signals on both leads 178 and 179 occur in iterative groups of three since there are three stages in each successive calculation of the three d.c. voltages resulting from the mixing of the I, the I/D, and the Q/D signals with the frequency doubled received signal. More specifically, the control signals on output lead 178 of counter/decoder 174 function to connect armature 163 of switch 152 to contact 165 during the first two stages of each group of three stages and then to connect armature 163 to contact 168 during the third stage of each group of three stages. On the other hand the control signals appearing on output lead 179 of counter/decoder 174 of FIG. 6 control switch 154 of FIG. 4 in such a manner that during the first stage the armature 162 is connected to grounded contact 166 of switch 154 so that the I signal will pass from switch 152 directly through mixer 151 and amplifier 153 to mixer 144 during said first stage count. During the second and third stages, however, the control signals on output lead 179 of counter/decoder 174 of FIG. 6 cause armature 162 of switch 154 to make with contact 169 so that the output from clock signal source 160 is supplied to mixer 151 and thereby modulates the I signal during the second stage and the Q signal during the third stage. The overall result is to supply in succession the I signal, the I/D signal, and the Q/D signal from mixer 153 through amplifier 156 and then to mixer 144.

What is claimed is:

1. A system for detecting distortion in a received signal which is phase modulated at a rate $f_d$ and which has a suppressed carrier signal of frequency $f_c$, without interrupting the signal, and comprising:
   first means for multiplying said received signal by itself N times to produce a first signal comprising a reconstructed carrier signal of frequency $Nf_c$ and phase $\phi_1$ and distortion produced upper and lower sidebands;
   second means for generating phase quadrature I and Q signals of frequency $Nf_c$;
   means for generating a clock signal of frequency $f_d$;
   means for mixing said I and Q signals with said clock signal to produce I/D and Q/D signals, respectively, where I/D represents the product of the I signal and said clock signal $f_d$ and Q/D represents the product of the Q signal and said clock signal D of frequency $f_d$; and means for independently mixing said I signal, said I/D signal and said Q/D signal with said first signal to produce d.c. voltages defining said distortion.

2. A system as in claim 1 in which said second means generates said phase quadrature I and Q signals with phases of $\phi_1$ and $\phi_1 \pm 90°$ respectively.

3. A system for on-line detection of distortion in a received digital signal which is phase modulated at a data rate $f_d$ and which has a suppressed carrier signal of frequency $f_c$, without interrupting the signal, and comprising:

first means for multiplying the digital signal by itself N times to produce a first signal comprising a reconstructed carrier signal of frequency $Nf_c$ and phase $\phi_1$ and distortion produced upper and lower sidebands;

second means for generating a second signal of frequency $Nf_c$;

means for generating a clock signal of frequency $f_d$;

control means for mixing said second signal with said clock signal to produce a third signal;

said control means further constructed to mix said second signal and said third signal with said first signal to produce d.c. voltages defining said distortion.

4. A system for continuous on-line detection of distortion of a received signal which is phase modulated at a data rate $f_d$ and which has a suppressed carrier signal of frequency $f_c$, without interrupting the signal, and comprising:

means for multiplying the digital signal by itself N times to produce a first signal comprising a reconstructed carrier signal of frequency $Nf_c$ and distortion produced upper and lower sidebands of frequencies determined by said phase modulation, where N is an integer determined by the type of phase modulation employed;

first signal generating means for generating an I signal of frequency $Nf_c$ in phase with said reconstructed carrier signal and a Q signal of frequency $Nf_c$ in phase quadrature with said reconstructed carrier signal;

second signal generating means for generating a clock signal of frequency $f_d$;

first mixer means for mixing said I signal and said first signal during a first time interval to produce a first d.c. signal proportional to the amplitude of said reconstructed carrier signal;

control means comprising second mixer means for mixing said I signal and clock signal during a second time interval to produce an I/D signal and for mixing said Q signal and said clock signal during a third time interval to produce a Q/D signal, where I/D represents the product of the I signal and said clock signal $f_d$ and Q/D represents the product of the Q signal and said clock signal D of frequency $f_d$;

said control means further comprising third mixer means constructed to mix said I/D signal and said first signal during said second time interval to produce a d.c. voltage proportional to the components of said distortive sidebands in phase with said I/D signal and to mix said Q/D signal and said first signal during said third time interval to produce a third d.c. signal proportional to the components of said distortive sidebands in phase with said Q/D signal; and means for comparing said first, second and third d.c. signals in a manner to determine the degree and nature of the distortion in said received digital signal.

5. A method for on-line detection of distortion in a received digital signal which is phase modulated at a data rate $f_d$, and which has a suppressed carrier signal of frequency $f_c$, and comprising the steps of:

multiplying said digital signal by itself N times to produce a first signal comprising a reconstructed carrier signal of frequency $Nf_c$ and phase $\phi_1$ and distortion produced upper and lower sidebands;

producing phase quadrature I and Q signals of frequency $Nf_c$;

producing a clock signal of frequency $f_d$;

mixing said I and Q signals with said clock signal to produce I/D and Q/D signals, respectively, where I/D represents the product of the I signal and said clock signal $f_d$ and Q/D represents the product of the Q signal and said clock signal D of frequency $f_d$; and mixing said I signal, said I/D signal, and said Q/D signal with said first signal to produce d.c. signals defining said distortion.

6. A method as in claim 5 in which said phase quadrature I and Q signals have phases of $\phi_1$ and $\phi_1 \pm 90°$, respectively.

7. A method for on-line detection of distortion in a received digital signal which is phase modulated at a data rate $f_d$, and which has a suppressed carrier signal of frequency $f_c$, and comprising the steps of:

multiplying said digital signal by itself N times to produce an intermediate signal S having a reconstructed carrier signal of frequency $Nf_c$ and phase $\phi_1$ and distortion produced upper and lower sidebands of frequencies $f_u = Nf_c + f_d$ and $f_l = Nf_c - f_d$, respectively;

producing I and Q signals of phases $\phi_1$ and $\phi_2 = \phi_1 \pm 90°$, respectively, and of frequency $Nf_c$;

producing a clock signal of frequency $f_d$;

independently mixing said I and Q signals with said clock signal to produce I/D and Q/D signals, respectively, where I/D represents the product of the I signal and said clock signal $f_d$ and Q/D represents the product of the Q signal and said clock signal D of frequency $f_d$; and independently and iteratively mixing said I signal, said I/D signal, and Q/D signal with said signal S to produce iterative groups of d.c. signals defining said distortion; and processing said iterative groups of d.c. signals to determine the nature of said distortion.

8. A method for on-line detection of distortion in a received digital signal which is phase modulated at a data rate $f_d$, and which has a suppressed carrier signal of frequency $f_c$, and comprising the steps of:

multiplying said digital signal by itself N times to produce a first signal having a reconstructed carrier signal of frequency $Nf_c$ and phase $\phi_1$ and distortion produced upper and lower sidebands;

producing a second signal of frequency $Nf_c$;

producing a clock signal of frequency $f_d$;

mixing said second signal with said clock signal to produce a third signal; and mixing said second signal and said third signal with said first signal to produce d.c. signals defining said distortion.

9. A method for on-line detection of distortion of a received digital signal which is phase modulated at a data rate $f_d$ and having a suppressed carrier signal of frequency $f_c$ without interrupting said received digital signal and comprising the steps of:

multiplying the received signal by itself N times to produce an intermediate signal S having a reconstructed carrier signal of frequency $Nf_c$ and of phase $\phi_1$, and distortion produced upper and lower sidebands of frequencies $f_u = Nf_c + f_d$ and $f_l = Nf_c - f_d$, where N is an integer determined by the type modulation employed;

producing an I signal and a Q signal of phases $\phi_1$ and $\phi_2 = \phi_1 \pm 90°$, respectively, and both of frequency $f_c$; generating a clock signal having a frequency $f_d$;

successively mixing said I and Q signals with said clock signal to produce I/D and Q/D signals each having a pair of sidebands of frequencies $f_u$ and $f_l$ with the phase of one of said pair of sidebands being in phase quadrature with the other pair of said sidebands, where I/D represents the product of the I signal and said clock signal $f_d$ and Q/D represents the product of the Q signal and said clock signal D of frequency $f_d$;

successively mixing said I signal, said I/D signal, and said Q/D signal with said S signal to produce d.c. signals indicative of the amplitude of the reconstructed carrier signal and the amplitudes of the said distortion produced sidebands; and computing various relationships between said d.c. signals to determine the nature and degree of said distortion of said signal.

* * * * *